US012519351B2

(12) United States Patent
Chang et al.

(10) Patent No.: US 12,519,351 B2
(45) Date of Patent: Jan. 6, 2026

(54) MOTOR STATOR COOLING STRUCTURE

(71) Applicant: FUKUTA ELECTRIC & MACHINERY CO., LTD., Tongluo Township, Miaoli County (TW)

(72) Inventors: Chin-Feng Chang, Tongluo Township, Miaoli County (TW); Chih-Meng Chu, Tongluo Township, Miaoli County (TW); Chen-Hui Chang, Tongluo Township, Miaoli County (TW); Chien-Hsun Chen, Tongluo Township, Miaoli County (TW)

(73) Assignee: FUKUTA ELECTRIC & MACHINERY CO., LTD., Tongluo Township (TW)

( * ) Notice: Subject to any disclaimer, the term of this patent is extended or adjusted under 35 U.S.C. 154(b) by 206 days.

(21) Appl. No.: 18/438,888

(22) Filed: Feb. 12, 2024

(65) Prior Publication Data
US 2025/0260274 A1   Aug. 14, 2025

(51) Int. Cl.
*H02K 1/20* (2006.01)
*H02K 9/19* (2006.01)

(52) U.S. Cl.
CPC .................. *H02K 1/20* (2013.01); *H02K 9/19* (2013.01)

(58) Field of Classification Search
CPC .................................. H02K 1/20; H02K 9/19
See application file for complete search history.

(56) References Cited

FOREIGN PATENT DOCUMENTS

| CN | 113783323 | * | 11/2022 | ............... H02K 1/20 |
| CN | 116191706 | * | 5/2023 | ............... H02K 1/20 |

* cited by examiner

*Primary Examiner* — Terrance L Kenerly
(74) *Attorney, Agent, or Firm* — Muncy, Geissler, Olds & Lowe, P.C.

(57) ABSTRACT

The present disclosure pertains to a motor stator cooling structure comprising a stator core and two oil spray rings attached to both ends of the stator core, respectively. The stator core comprises a yoke and multiple core teeth extending inward from the yoke. Each of the core teeth internally forms a cooling fluid channel extending axially along the stator core. Each oil spray ring is designed with staggered oil outlet holes and oil guide grooves. The staggered arrangement of the two oil spray rings causes the oil outlet holes at both ends of the stator core to interlace. It allows the cooling fluid to enter the stator core from both ends simultaneously and in a staggered manner along the axial direction, achieving a uniform cooling effect and ameliorating localized high-temperature conditions in the motor stator.

6 Claims, 5 Drawing Sheets

MOTOR STATOR COOLING STRUCTURE

FIELD OF INVENTION

The present disclosure relates to a cooling structure for motor stators, in particular to a cooling structure enabling the motor stator to be sufficiently cooled during operation.

BACKGROUND OF THE INVENTION

Motors generate heat during operation, resulting in elevated temperatures. Therefore, a cooling structure is required to reduce these temperatures and prevent overheating that could cause structural damage.

Currently, many motor cooling methods involve the use of cooling fluid channels. These channels spray cooling fluid onto the coils of the motor to achieve a cooling effect. However, because most cooling fluid channels are unidirectional, they are unable to cool the motor evenly at both ends and the center, resulting in higher temperatures at the center or one side.

SUMMARY OF THE INVENTION

Based on the foregoing deficiencies, the purpose of the present disclosure is to provide a motor stator cooling structure, particularly one that allows the motor stator to be adequately cooled during operation.

According to the purpose of the present disclosure, there is provided a motor stator cooling structure comprising a stator core having a yoke and multiple core teeth extending inward from the yoke. Each of these core teeth has multiple cooling fluid channels extending axially along the stator core. In addition, two oil spray rings are attached to both ends of the stator core, respectively, wherein each oil spray ring has multiple teeth corresponding to the core teeth, multiple oil outlet holes spaced apart from each other at these teeth, and multiple protrusions spaced apart from each other on an outer circumferential surface where an oil guide groove is formed between two adjacent protrusions. The two oil spray rings are arranged in a staggered manner so that the oil outlet holes at both ends of the stator core are interlaced with each other.

Preferably, the oil outlet holes and oil guide grooves of each oil spray ring are arranged in a staggered manner.

Preferably, the motor stator cooling structure further comprises a coil wound around the core teeth of the stator core.

Preferably, the motor stator cooling structure further comprises two end caps each disposed on the outside of the two oil spray rings. The outer circumferential surface of the two end caps comprises an oil inlet and an oil outlet.

Preferably, the two oil spray rings are made from high-polymer insulating materials formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof.

Preferably, the two end caps are made from high-polymer insulating materials formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof.

DETAILED DESCRIPTION OF THE PREFERRED EMBODIMENTS

Figure 1:
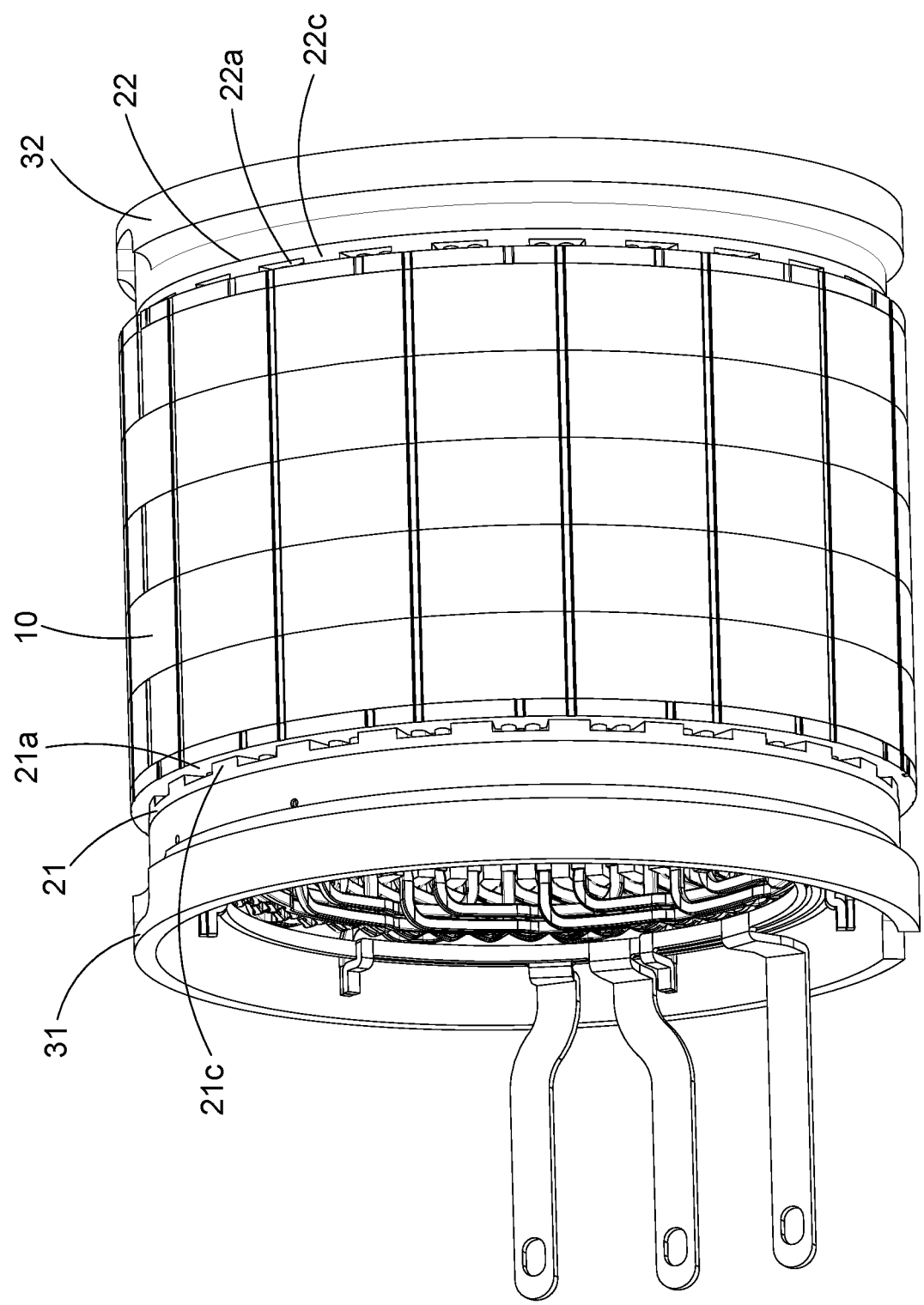
FIG. 1 is a schematic diagram of an embodiment of the present disclosure.
Figure 2:
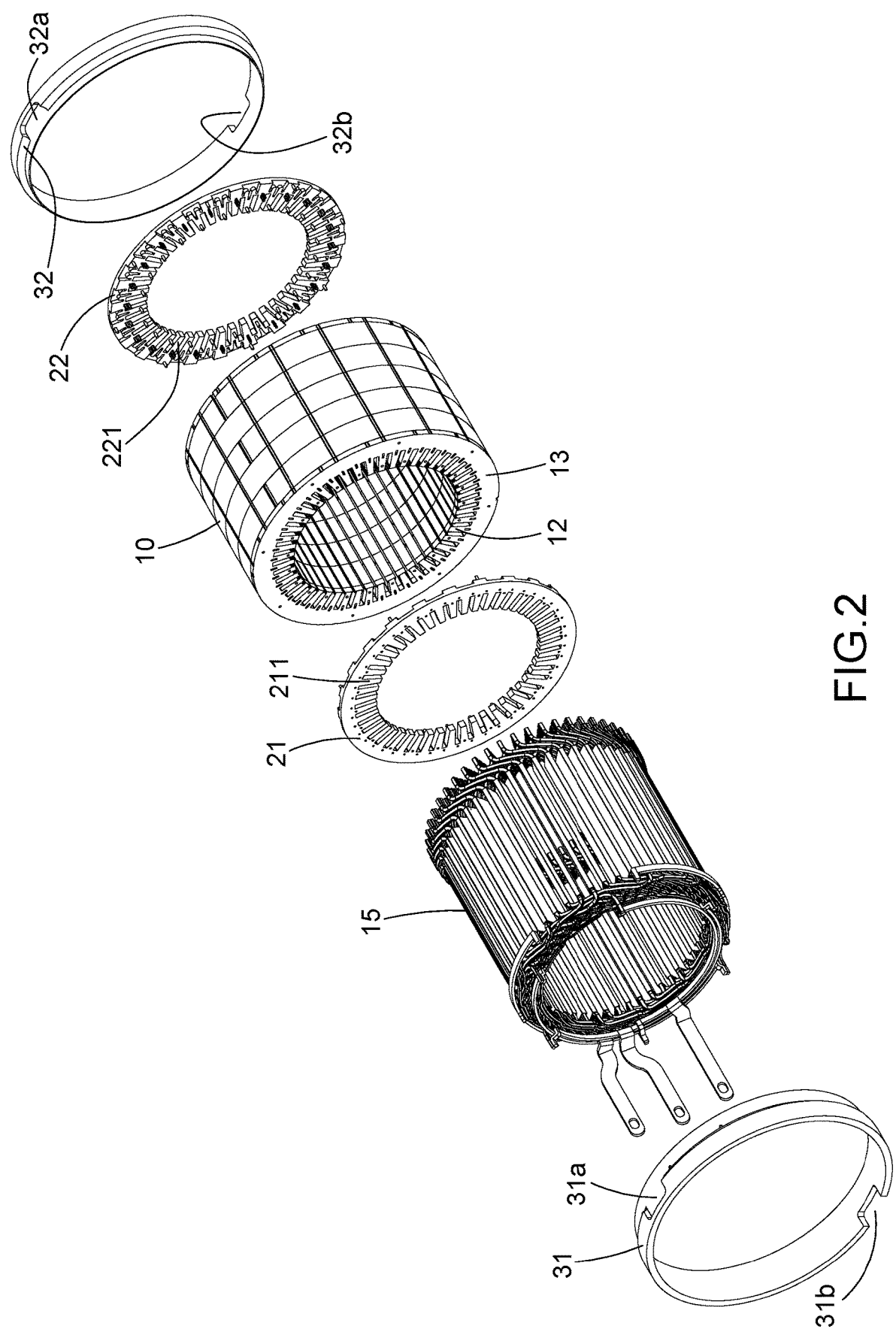
FIG. 2 is an exploded view of the components of an embodiment of the present disclosure.

To clearly illustrate the specific implementations, structure, and effects achieved by the present disclosure, an embodiment is provided along with accompanying drawings. In the present disclosure, the axial direction of the stator core 10 is referred to as the left or right direction, and the radial direction is referred to as the upper or lower direction.

Referring to FIGS. 1 to 5, a motor stator cooling structure is depicted, comprising a stator core 10 and two oil spray rings 21, 22 attached to both ends of the stator core 10, respectively. The stator core 10 is composed of multiple silicon steel sheets having a yoke 13 and multiple core teeth 12 extending inward from the yoke 13. Each of these core teeth 12 internally forms a cooling fluid channel 11 extending axially along the stator core 10, and a coil 15 is wound around these core teeth 12 of the stator core 10.

In this embodiment of the present disclosure, the two oil spray rings 21, 22 are made from high-polymer insulating material formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof. These oil spray rings 21, 22 are made of different materials than the stator core 10, which is used to enhance the insulating ability of the motor stator.

Figure 3:
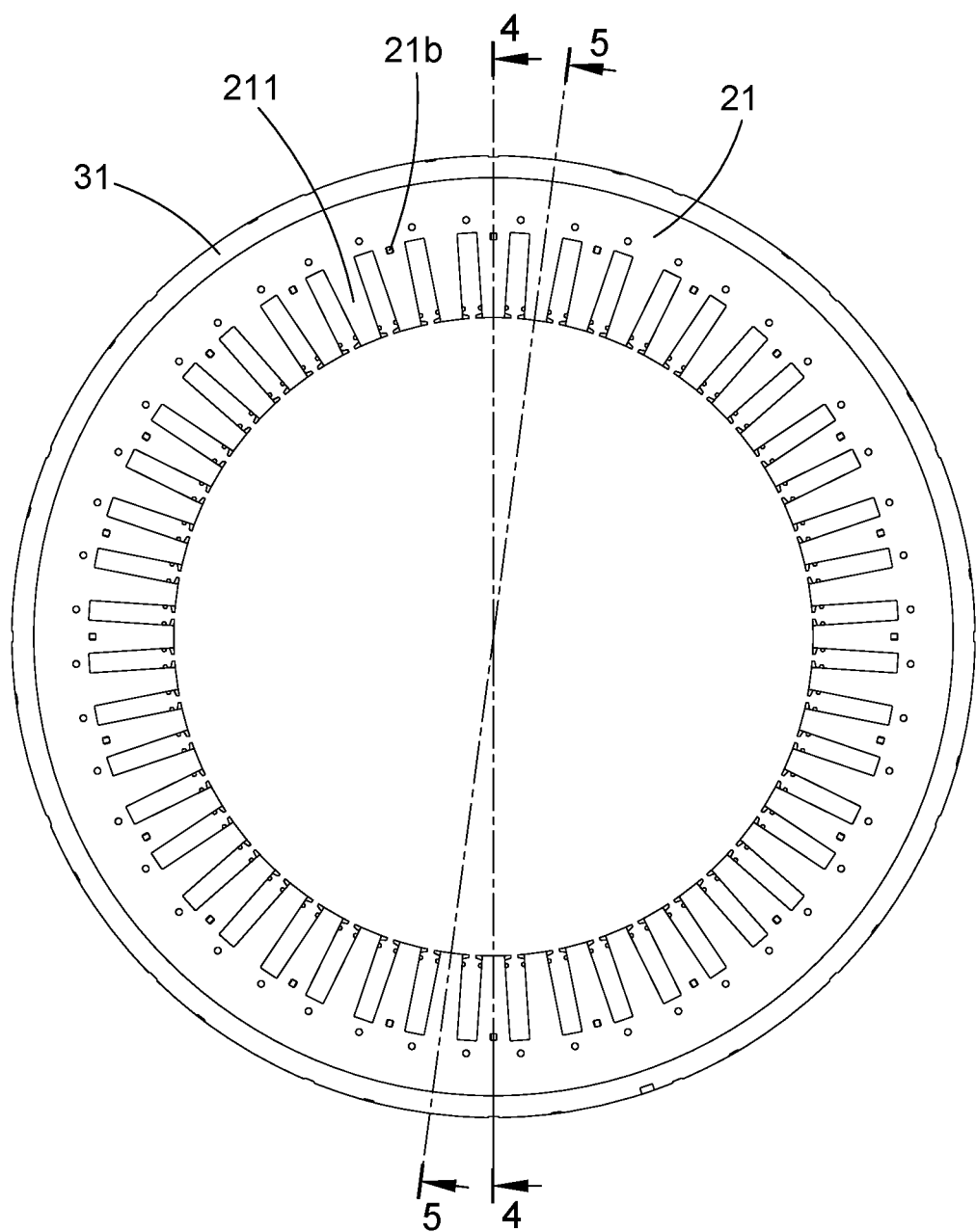
FIG. 3 is a side view of an embodiment of the present disclosure.
Figure 4:
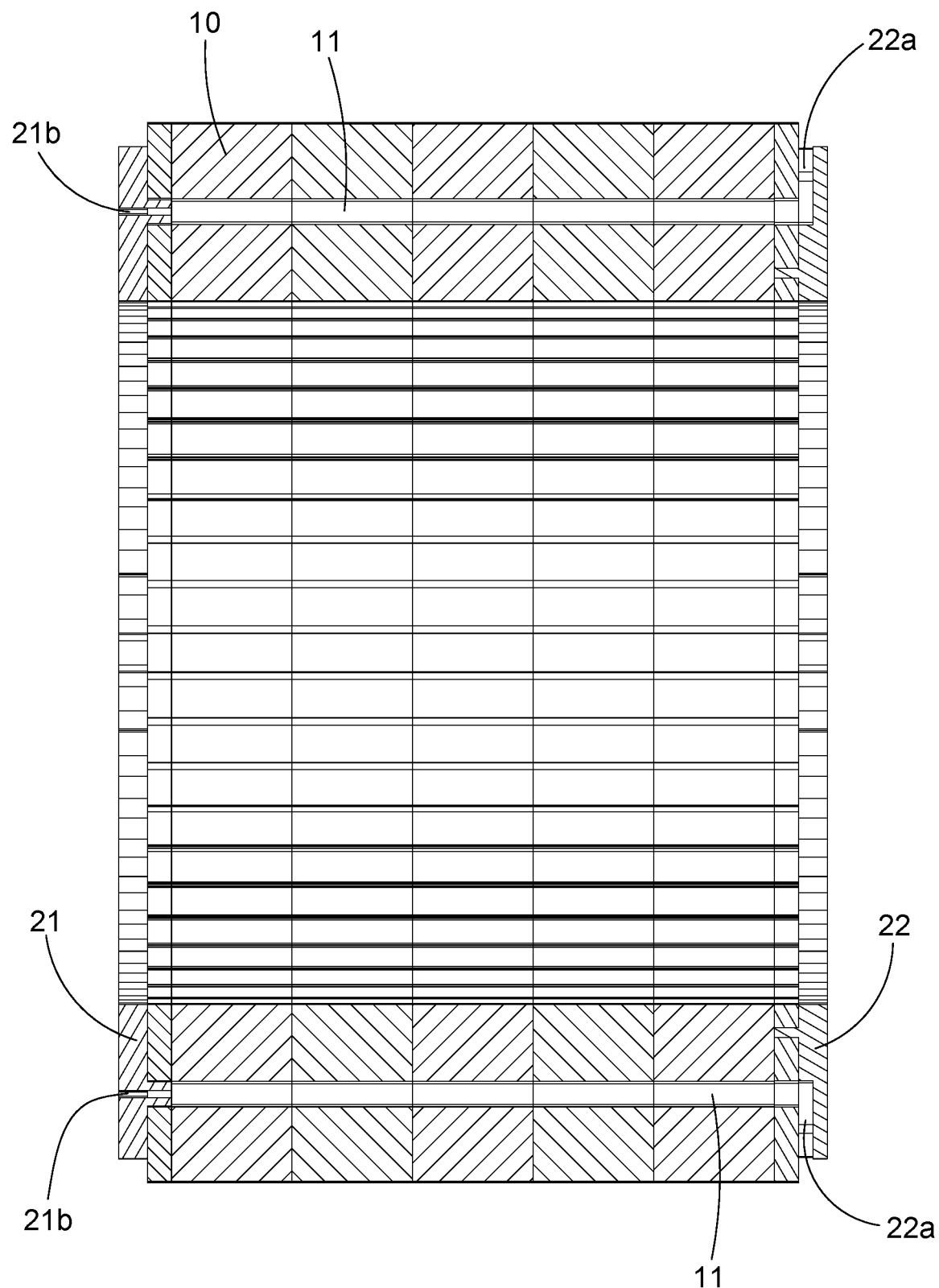
FIG. 4 is a sectional view along the line 4-4 in FIG. 3.
Figure 5:
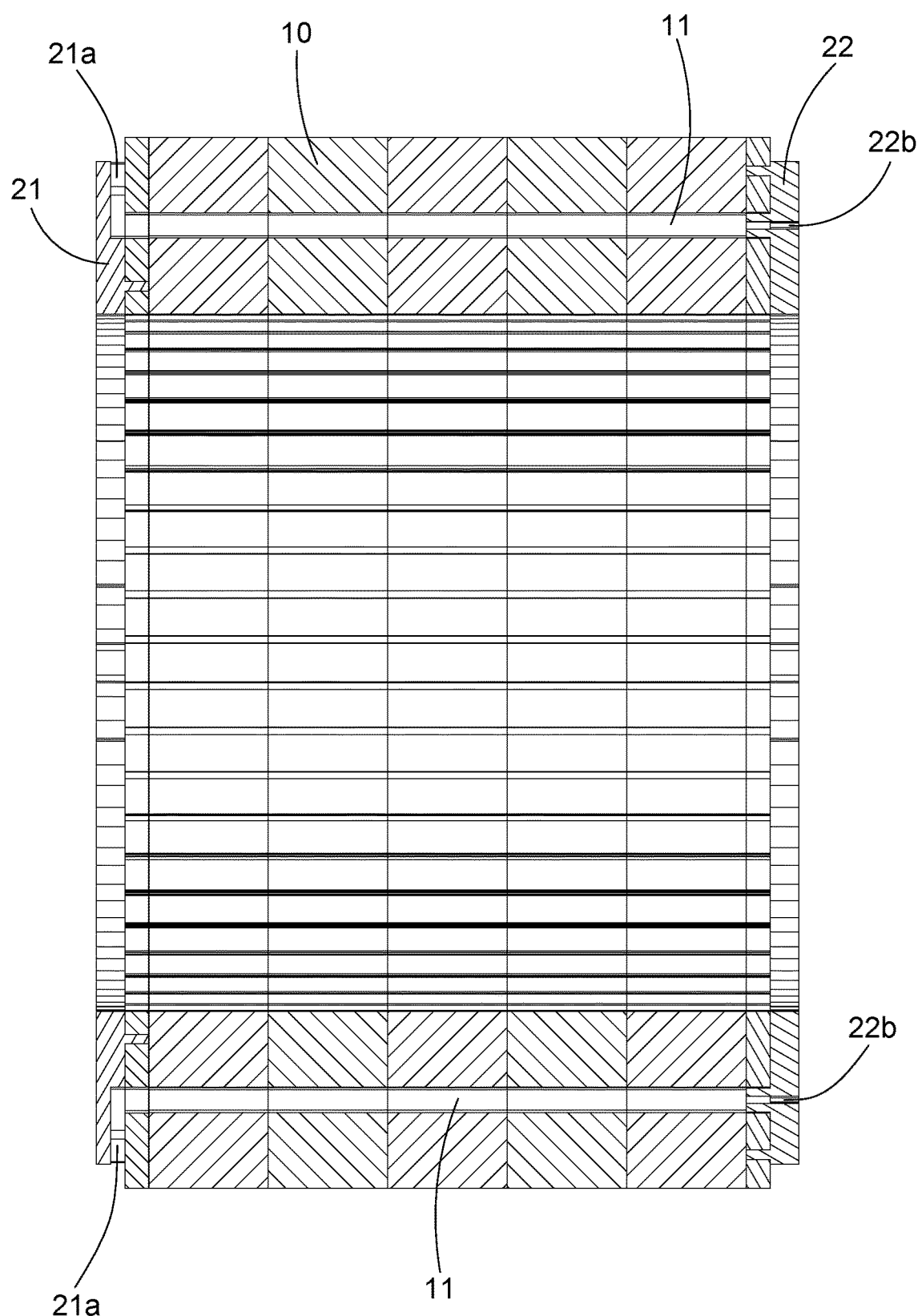
FIG. 5 is a sectional view along the line 5-5 in FIG. 3.

Referring to FIGS. 3 to 5, each of the oil spray rings 21, 22 has multiple teeth 211, 221 corresponding to the core teeth 12, and each has multiple oil outlet holes 21b, 22b spaced apart along the circumference of the oil spray rings 21, 22 on these teeth 211, 221. The outer circumferential surface of each of the oil spray rings 21, 22 has multiple protrusions 21c, 22c spaced from each other, with an oil guide groove 21a or 22a formed between two adjacent protrusions 21c, 22c. The two oil spray rings 21, 22 are staggeredly arranged at both ends of the stator core 10 so that the oil outlet holes 21b, 22b are interlaced with each other, i.e., the oil guide grooves 21a, 22a at both ends of the stator core 10 are also staggeredly arranged to form the state shown in FIGS. 4 and 5. Wherein, the oil guide grooves 21a, 22a are used to guide the cooling fluid into the cooling fluid channel 11, while the spaced protrusions 21c, 22c seal the entrances of the cooling fluid channels 11 not connected to the oil guide grooves 21a, 22a. When the oil spray rings 21, 22 are staggered, there is only one oil guide groove 21a, 22a present in the same axial direction, allowing the stator core 10 to form a state in which the cooling liquid can be introduced from both ends simultaneously and in a staggered manner.

Furthermore, two end caps 31, 32 are disposed on the outside of each oil spray ring 21, 22, respectively, with the outer circumferential surface of each end cap 31 or 32 having an oil inlet 31*a* or 32*a* and an oil outlet 31*b* or 32*b*, which are located on the same diameter. More specifically, the cooling fluid enters from the oil inlet 31*a* of the left end cap 31 and flows toward the oil guide groove 21*a* of the oil spray ring 21, then enters the cooling fluid channel 11 of the stator core 10, and after flowing out from the oil outlet hole 22*b* of the right oil spray ring 22, the fluid is then led out from the oil outlet 32*b* of the right end cap 32. That is, the oil guide groove 21*a* and the oil outlet hole 22*b* located in the same axial direction are interconnected with the cooling fluid channel 11 of the stator core 10. At the same time, in the adjacent cooling fluid channels 11, cooling fluid flows from the oil inlet 32*a* of the right end cap 32 toward the oil guide groove 22*a* of the oil spray ring 22, and out from the oil outlet hole 21*b* of the left oil spray ring 21 and is led out from the oil outlet 31*b* of the left end cap 31. These end caps 31, 32 are made from high-polymer insulating material formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof.

Referring to FIG. 4, when the two oil spray rings 21, 22 are staggeredly arranged, the right end of the stator core 10 is the oil guide groove 22*a*, and the left end is the oil outlet hole 21*b*, while the adjacent cooling fluid channels 11 are connected to the oil guide groove 21*a* at the left end (as shown in FIG. 5) and the oil outlet hole 22*b* at the right end, allowing the cooling fluid to enter and evenly spray the coil 15 from both ends of the stator core 10 simultaneously and in a staggered manner, forming cooling circuits with completely opposite flow directions. This arrangement exchanges temperatures on both sides of the motor stator, improves the temperature distribution of the motor stator, and achieves a uniform cooling effect, thus ameliorating localized high-temperature conditions in the motor stator.

The present disclosure improves the insulating ability of the motor stator through the oil spray rings 21, 22 made of materials different from the stator core 10. Through the staggered arrangement of the oil spray rings 21, 22, the cooling fluid can enter the stator core 10 from both ends simultaneously and in a staggered manner along the axial direction and flow out radially from the oil outlets 31*b*, 32*b* of the end caps 31, 32, achieving a uniform cooling effect and ameliorating localized high-temperature conditions in the motor stator.

What is claimed is:

1. A motor stator cooling structure comprising:
   a stator core having a yoke and multiple core teeth extending inward from the yoke, each of the core teeth having a cooling fluid channel extending axially along the stator core; and
   two oil spray rings, respectively attached to both ends of the stator core, each oil spray ring having multiple teeth corresponding to the core teeth, multiple oil outlet holes spaced apart from each other at these teeth, and multiple protrusions spaced apart from each other on an outer circumferential surface where an oil guide groove is formed between two adjacent protrusions, and the two oil spray rings being arranged in a staggered manner so that the oil outlet holes at both ends of the stator core are interlaced with each other.

2. The motor stator cooling structure according to claim 1, wherein the oil outlet holes and the oil guide grooves of each oil spray ring are arranged in a staggered manner.

3. The motor stator cooling structure according to claim 1, further comprises a coil wound around the core teeth of the stator core.

4. The motor stator cooling structure according to claim 1, further comprises two end caps each disposed on the outside of the two oil spray rings, and both the outer circumferential surface of the two end caps has an oil inlet and an oil outlet.

5. The motor stator cooling structure according to claim 1, wherein the two oil spray rings are made from high-polymer insulating materials formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof.

6. The motor stator cooling structure according to claim 1, wherein the two end caps are made from high-polymer insulating materials formed by injection molding, including Polycarbonate (PC), Polyphenylene Sulfide (PPS), Polyetheretherketone (PEEK), Polyamide 6-6 (PA66), Polybutylene Terephthalate (PBT), Polyethersulfone (PES), Polysulfone (PSU), Polypropylene (PP), Polyethylene (PE), Polyoxymethylene (POM), Polyvinyl Chloride (PVC), or a mixture thereof.

\* \* \* \* \*